April 26, 1927.
A. G. DESCHENES
1,625,797
MACHINE FOR FRYING PEANUTS AND THE LIKE
Original Filed Feb. 8, 1923    3 Sheets-Sheet 2
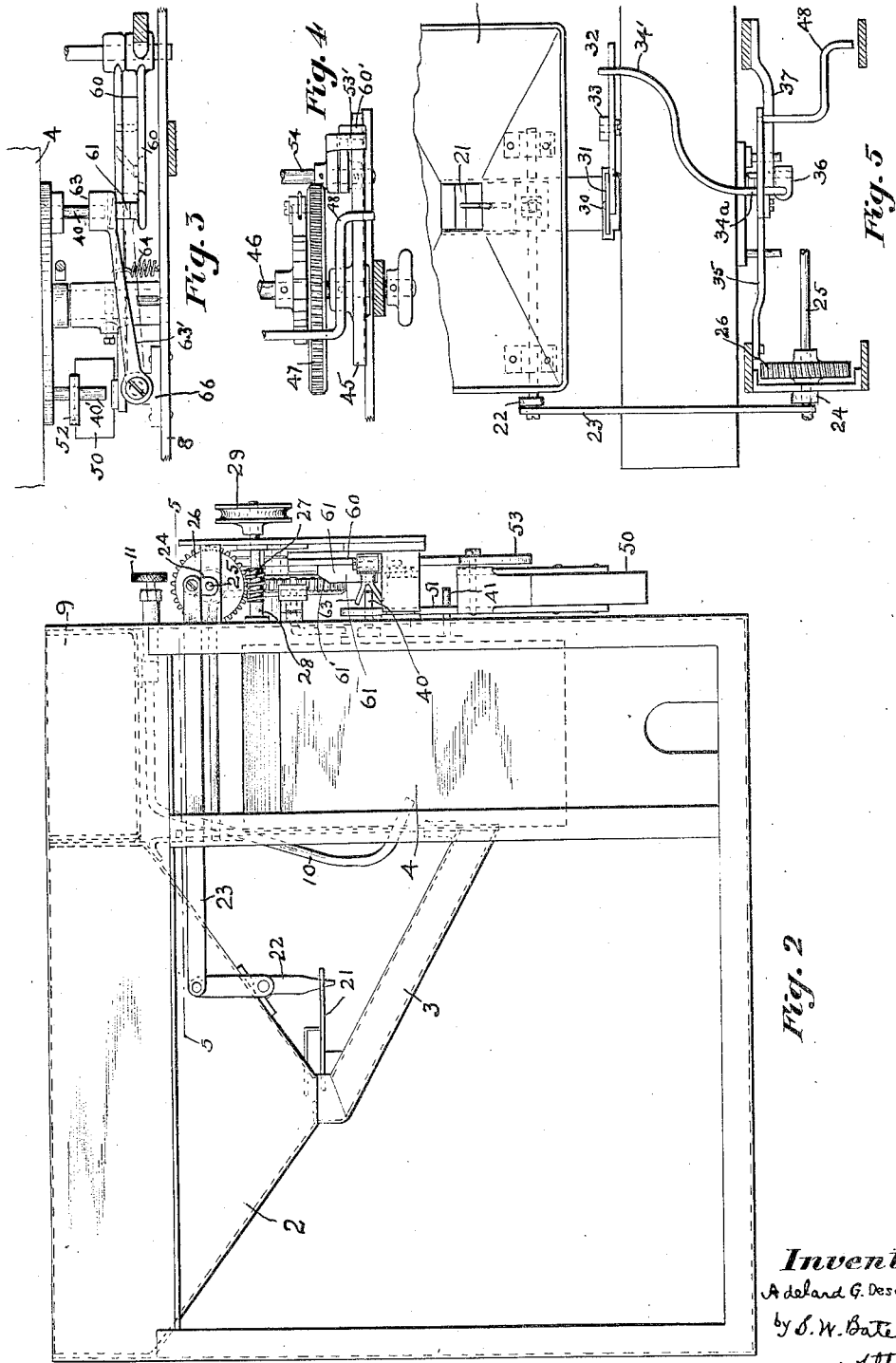
Inventor.
Adelard G. Deschenes
by S. W. Bates
Atty April 26, 1927. 1,625,797
A. G. DESCHENES
MACHINE FOR FRYING PEANUTS AND THE LIKE
Original Filed Feb. 8, 1923 3 Sheets-Sheet 3
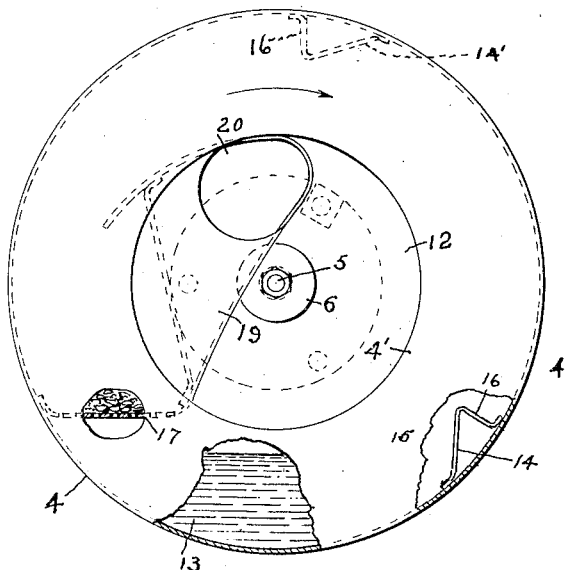
Fig. 6
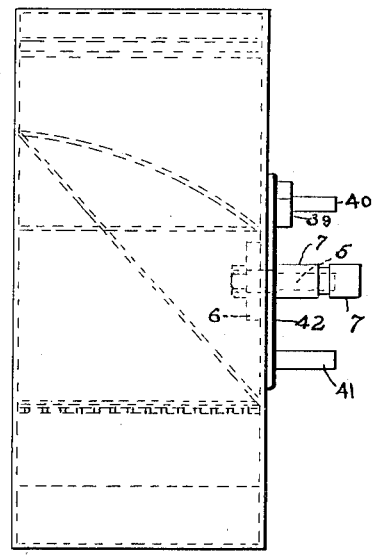
Fig. 7
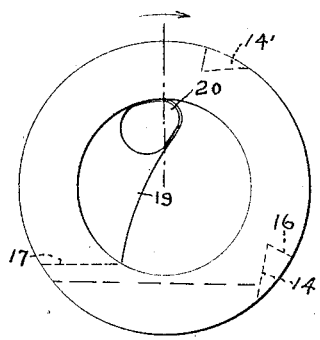
Fig. 8
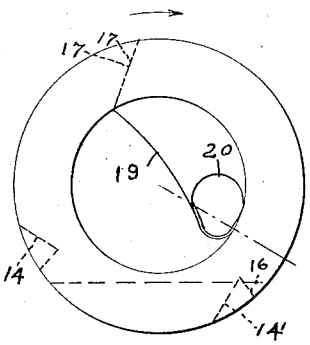
Fig. 9
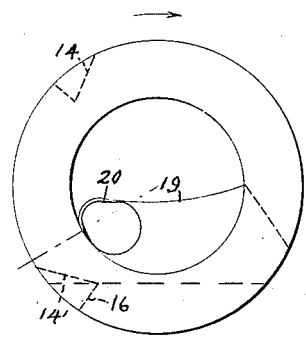
Fig. 10
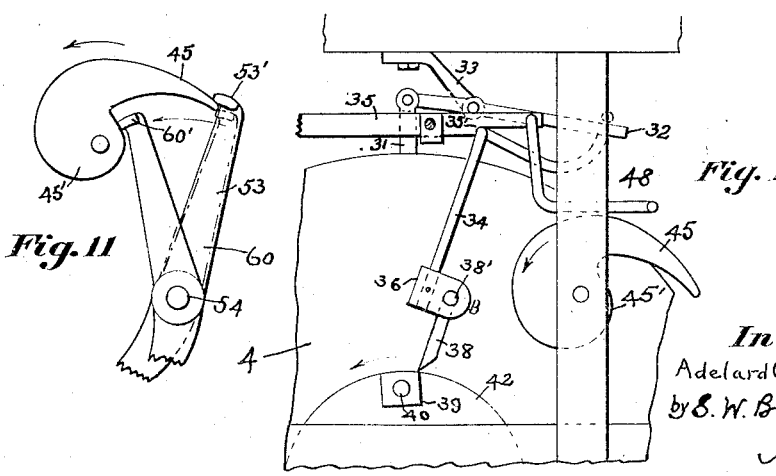
Fig. 11
Fig. 12
Inventor:
Adelard G. Deschenes
by S. W. Bates.
Atty.

Patented Apr. 26, 1927.

1,625,797

UNITED STATES PATENT OFFICE.

ADELARD G. DESCHENES, OF LISBON, MAINE, ASSIGNOR OF ONE-HALF TO EUGENE A. BRUNELLE, OF SOMERSWORTH, NEW HAMPSHIRE.

MACHINE FOR FRYING PEANUTS AND THE LIKE.

Application filed February 8, 1923, Serial No. 617,673. Renewed April 11, 1924.

My invention relates to machines for frying articles of food as shelled peanuts or other shelled nuts which are handled in small quantities.

The particular object of the invention is to produce a simple machine which will fry a small quantity of nuts at a time delivering a regular intermittent supply so that a freshly cooked supply will always be on hand for customers. Peanuts, almonds and the like are often kept on hand in candy stores and other stores but when kept in large quantities and for any considerable length of time, they are liable to become rancid and to spoil.

By the use of my apparatus which is entirely automatic in its action, a continuous supply of fried peanuts is discharged intermittently from the machine, t e output of which may be accurately regulated to supply the trade wherever the machine happens to be installed.

My invention may be embodied in different types of machines, one of which I illustrate in the accompanying drawings and described hereinafter. In this particular embodiment, nuts in small predetermined quantities or batches are fed automatically into a container, which, in this case, is a rotating drum holding the cooking liquid. Suitable mechanism is provided for rotating this drum preferably intermittently in order that the nuts may have ample time to cook during the pauses between movements. Agitators within the drum effect a tumbling of the nuts while submerged in the liquid so that all the nuts in a batch may be fully exposed to the cooking medium. The drum also has means within it, hereinafter more particularly termed an apron, by which the nuts are withdrawn from the liquid, permitted to drain and finally are discharged. The timing of the mechanism is such that as one batch of nuts is being drained of cooking oil another may be automatically fed from a hopper holding a supply of uncooked nuts.

It is intended that the patent shall cover by suitable expression in the appended claims whatever features of patentable novelty exist in the invention disclosed.

Referring to the drawing:—

Fig. 2 is a side elevation,

Fig. 3 is a section on the line 3—3 of Fig. 1,

Fig. 4 is a section on the line 4—4 of Fig. 1 with a portion in plan,

Fig. 5 is a section on the line 5—5 of Fig. 2,

Figure 1:
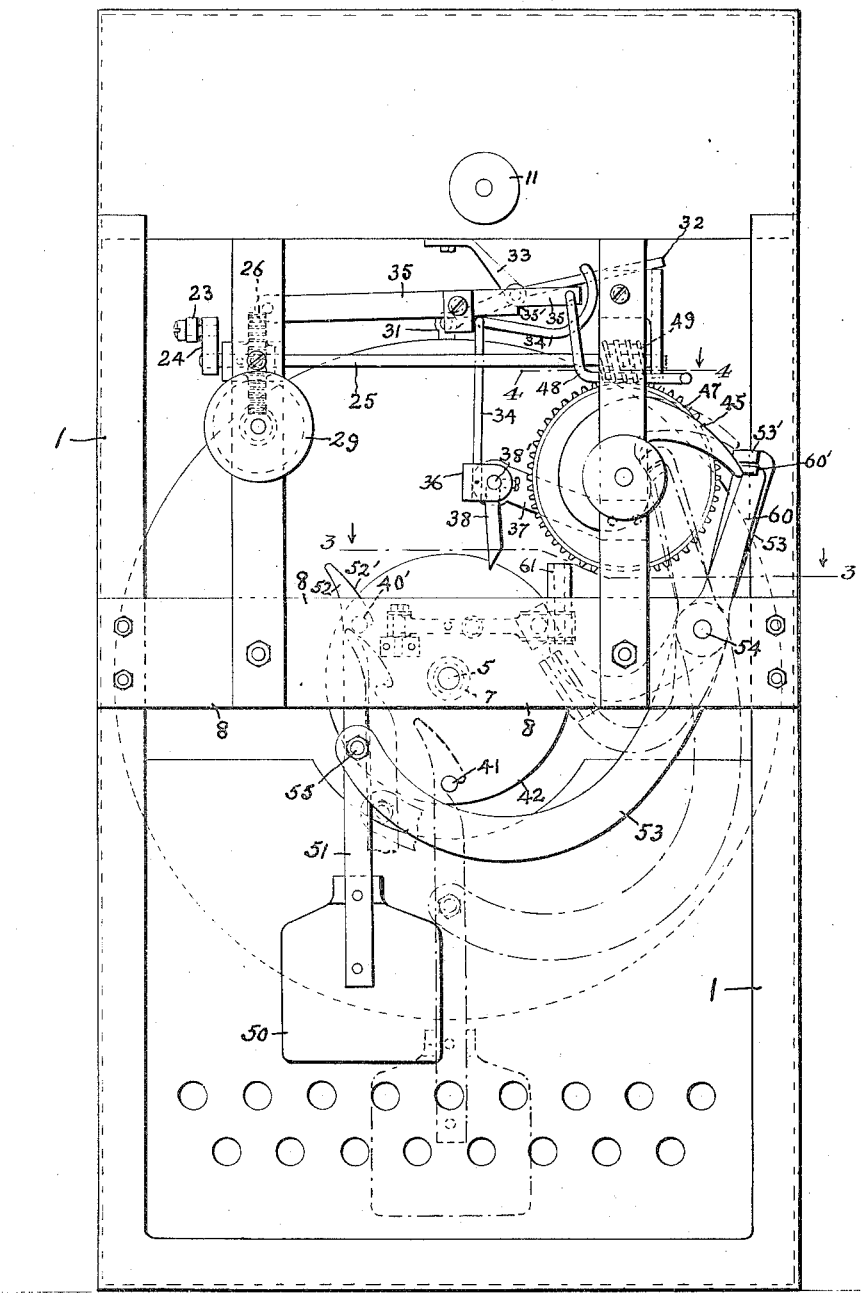
Fig. 1 shows a general rear elevation of the machine.

Fig. 6 is a front view of the frying drum taken in what I call the first position or that position in which it stands when receiving the charge of peanuts, Fig. 7 is a side elevation of the same, Figs. 8, 9, and 10 are front elevations of the drum showing its successive positions as it turns one-third revolution each time from the first position as shown in Fig. 6, Fig. 11 is a detail of the cam and some of the connecting parts and, Fig. 12 is a side elevation of a portion of the rear side of the cooking drum showing a portion of the mechanism for operating the shut-off valve that admits the charge of uncooked peanuts to the drum.

Referring to the drawings, the machine comprises a framework or support 1 in the upper portion of which is a hopper 2 designed to be filled with shelled peanuts with an inclined chute 3 leading from its outlet through which the peanuts in their raw state are designed to be discharged into an opening in the front end of the rotating cooking drum 4. The drum 4 is journalled in the frame of the machine by an enlongated journal 5 rigidly secured to a collar 6 and extending through an elongated journal box 7 rigidly secured to the supporting bar 8 formed as a part of the framework 1. The drum 4 has a relatively large diameter as compared with its axial length, the rear end being completely filled by a circular plate to which is fixed the collar or disk 6 and the front end being partially closed by an annular flange or rim 4' leaving a central opening through which the nuts are fed to the cooking drum and discharged therefrom. The cooking oil is contained in a compartment 9 at the top of the frame and is fed to the drum by a duct 10, the flow of the oil being controlled by a suitable valve 11. The lower end of the duct 10 extends through the circular opening 12 in the front end of the drum.

The nuts are fried in a suitable quantity of oil 13 contained in the lower portion of the drum, a quantity of oil being continuously drawn from the tank 9 to keep the oil at the necessary level for continuous operation.

Means are provided for tumbling the nuts more or less and agitating them while in the operation of frying and for this purpose, as here shown, I provide on the inner periphery of the drum one or more agitators in the form of angle plates so that the nuts will tumble over them as the drum rotates, substantially changing their position with respect to each other. I show herein two of such agitators 14 and 14' each inclined on one side at an angle to the periphery of the drum forward with relation to the movement of the drum, the other side 16 being substantially at right angles to the same so that the nuts as the drum rotates will slide over the inclined side falling over the right angular face 16.

It will be understood that means are provided for keeping the oil at the proper frying temperature and this may be a gas or oil flame placed under the drum or other means for producing the necessary heat for frying the nuts. The charge of nuts is designed to be entirely cooked during a single revolution of the drum and the revolution of the drum is preferably effected by three intermittent rotary motions each one of which revolves the drum one-third of a revolution turning it into three separate positions. Between the rotary motions there are pauses long enough to give the peanuts time to cook.

The motion of the drum from one position to the next is designed to be comparatively rapid so as to tumble or disarrange the peanuts in order that they may fry evenly throughout their entire surface.

The charge of peanuts is fed into the drum when it is in what I call its first position or the point where the frying actually begins, this position being shown in Figs. 6 and 8.

The second position is shown in Fig. 9, the drum having moved one-third revolution and the third position is shown in Fig. 10, the drum having moved two-thirds of a complete revolution and the third motion brings it again to its first position.

The charge of uncooked nuts being fed into the drum when it is in its first position, it then turns to its second position as shown in Fig. 9. During this motion, the agitator 14 passes through the pool of oil in which the nuts are submerged and the nuts are tumbled over the inclined side falling back into the pool of oil and becoming thoroughly stirred up during this operation.

The nuts remain cooking in this position, that is, with the drum in its second position during the regular interval between the turning impulses at the end of which time the drum is turned to its third position.

In passing from its second to its third position, the agitator 14' passes through the pool of oil carrying the charge of nuts with it, stirring them and leaving them submerged in the pool.

The nuts having now been twice agitated and remaining through two periods submerged in the oil are now thoroughly cooked, agitated and are ready to be removed from the oil.

This last operation takes place as the drum moves from its second to its third position which is the same as its first position, the drum having made a complete revolution by its three movements. The nuts are skimmed or carried from the oil by a perforated apron 17 secured to the inner periphery of the drum and lifted to a position somewhat above the level of the oil where they are held during the next period between revolutions and there given time to thoroughly drain the oil back into the pool (see Fig. 6).

Meanwhile, another charge has been fed to the machine by mechanism hereinafter more fully described and the next revolution of the drum which brings it to what I call the second position collects the charge of completely cooked nuts into the collecting trough and discharges them through the discharge nozzle of said trough out of the front portion of the drum.

The trough 19 is arranged generally diagonally to the periphery of the drum, the apron 17 forming its rear end, the trough extending across diagonally and forwardly and terminating in the discharge nozzle 20, the outer end of which is arranged flush with the front face of the drum.

The charge of nuts having accumulated when the drum stops in its first and third position resting on the upper surface of the apron 17 when the drum now turns to the second position, the nuts slide longitudinally through the trough and spill out through the discharge nozzle 20. The motions of the drum referred to are effected as follows:—

As already stated, the nuts are fed into the drum through an inclined chute 3 from the outlet of the hopper 2. A fixed quantity of nuts is allowed to run into the chute 3 at regular intervals by means of a gate or shutoff 21 which controls the outlet of the hopper 2, (see Fig. 2). This gate 21 is pivotally connected with the lower end of a lever 22, the upper end of which is connected with a reach rod or link 23 which is reciprocated longitudinally by being journalled to a crank 24 on the end of a crank shaft 25. The crank shaft 25 is in reality the main power shaft of the machine. Near one end and adjacent to the crank 24 is a worm gear 26 which is engaged by a worm 27 on a shaft 28, this same shaft 28 being provided with a pulley 29 from which motion is taken from a suitable motor not here shown.

It will thus be seen that the rotation of the pulley 29 transmitting motion through the shaft 28, worm 27, worm gear 26, crank 24 and reach rod 23 cause the shut-off 21 to open and close at regular intervals, these intervals being just sufficient to let a full charge of peanuts into the chute 3 during one complete revolution of the drum.

The charge which thus accumulates in the chute 3 is allowed to pass into the drum in a body. The motions are so adjusted that the charge is released suddenly when the drum is in its first position as already indicated.

The outlet of the chute 3 is controlled by a shut-off valve 30 (see Fig. 5) located at the outlet of the chute 3 and controlled by a vertically operating rod 31 (see Fig. 1) connecting with the shut-off valve 30. The rod 31 is lifted and released by a lever 32 pivoted to a bracket 33. The lever 32 is depressed by the action of another lever 34, bent into a somewhat irregular shape and terminating in a substantially horizontal arm 34′ which rests normally on the end of the lever 32 to which is pivoted the vertical rod 31. The lever 34 also has intermediate its ends a substantially horizontal portion 34ª (see Fig. 5) which passes directly beneath a lever 35 pivoted to the frame of the machine by one of its ends.

The lower end of the lever 34 or the end opposite the end 34′ is connected to a block 36 which in turn is pivoted to a bracket 37 secured to the frame of the machine. Extending downward from the block 36 is an arm 38 which is so located as to be in the line of movement of a stop 39 (see Fig. 12) secured to the rotating drum 4.

The short arm 38 being hit by the stop 39 spoken of, the lever 34 turns on its pivot 38′, moves the horizontal end 34′ downward, depressing the end of lever 32 thus lifting rod 31 with its shut-off valve and allowing the charge of nuts in chute 3 to run into the drum 4. At the same time the intermediate portion 34ª slides along beneath the lever 35 and catches in the notch 35′. The stop by which the arm 38 is tripped is a block 39 secured on a pin 40 which with two other pins 40′ and 41 project out from a disk 42 securely riveted or otherwise axially secured to the rear wall of the drum 4. These three pins 40, 40′ and 41 are disposed equally distant from the center of rotation of the drum and about 120 degrees apart so that each represents one-third the circumferential distance around the drum. (See Fig. 1.) The catching of the lever 34 in the notch 35′ of the lever serves to hold the lever 32 depressed a predetermined length of time, the shut-off valve 30 being held open during this time at the end of which time it is closed by the lifting of the lever 35 releasing the lever 34 and allowing the valve 30 to close by its own weight and that of the rod 31 and the connecting parts.

The lever 35 is lifted at the proper time by means of a cam 45 located on the shaft 46 on which is the worm gear 47. On the free end of the lever 35 is secured a bent arm 48 which extends across and slightly above the cam 45 and in such a position that the cam lifts it slightly on each of its revolutions which correspond with the revolutions of the cooking drum.

Both the gear 47 and the cam 45 are located on the shaft 46 (see Fig. 4) and the gear is rotated by a worm 49 on the shaft 25 before spoken of as taking its motion from the driving pulley.

The intermittent rotation of the drum is effected by a weight which is lifted at regular intervals and hooked into one of the pins 40, 41 and 41′. As here shown, the weight 50 has a vertical arm 51 at the top of which it is formed into a hook 52 which has at the extreme upper end an inclined surface 52′ extending well beyond the edge of the arm 51. Thus, the weight as it is lifted will automatically catch on one of the pins 40, 40′ and 41 as each in turn comes to the desired position or 120 degrees from the bottom pin when drawn by the weight to a point directly below the center of rotation of the drum. The weight is lifted and hooked onto each of the pins in turn as it comes to its position by a suitably formed lifting lever 53 pivoted to the frame by a pivot 54. The lever 53 has an upward extending end having its upper end bent outwardly at 53′ to be in the line of rotation of the cam 45. The lower end of the lever 53 is pivoted to the arm 51 at the point 55 so that the weight is lifted to be hooked on to one of the pins, etc.

The effective surface of the cam is helical in shape, cut away near the hub and with an extended point at the outer end of its throw.

The drum is completely rotated by three successive movements each of which carries it one-third around, these motions being carried out with comparative rapidity. Between each of the three movements, there is a pause depending on the rapidity of rotation of the shaft 46 and the cam 45.

The weight 50 is lifted and the hook 52 hooked over the pin 40′ by the action of the cam 45 swinging the upper end of the lever 53 outward and lifting the lower end having the weight arm pivoted thereto at 55. The distance of the pivot 55 and the pin 40′ from the pivotal point 54 is the same so that as the arm 53 swings through the action of the cam 45 bearing on the inward extension 53′ of the arm 53, the arm with the pivot moves upward. Thus, by the time the end of the cam is at a point where it slips away from the projection 53' the hook 52 has taken its position and become hooked onto the pin 40'.

The cam now releases, the projection 53' no longer sustaining the weight and the latter falls so that the pin 40' comes to rest directly beneath the center of rotation of the arm or at the point indicated by 41 in Fig. 1.

The dotted lines show the successive positions of the hook and the lever 53 until the drum comes to rest with one of the pins at its lower position. The upper end of the lever 53 meanwhile, being released by the cam has swung inward against the inner hub 45' of the cam as shown by dotted lines in Fig. 1 and remains in this position until the helical cam surface gradually lifts the weight again hooking it onto the next pin in order. When the drum is turned by the weight 50 as here shown, and reaches its lowest position, there is a tendency to set the drum in vibration as the dropping of the weight creates a considerable shock on the moving part.

I provide means for steadying the drum and holding it fixed in its new position each time the weight moves it one-third of a revolution. For this purpose, I provide a clamping device which seizes one of the rotation pins and holds it firmly against oscillation after the drum has been disturbed by the falling of the weight. As here shown, I provide an arm lever 60 pivoted on the same pivot 54 with the lever 53 and having an inward projection 60' which lies directly beneath the projection 53' of the lever 53. The function of the lever 60 is to force over the end of one of the pins at about the time the movement is completed a V-shaped block which encloses and holds it steadily in position again vibration. This V-shaped block 63 is formed to straddle the end of one of the pins as 40 being pressed into position over the pin by a bevelled block 61 carried by the end of the lever 60. The bevelled block 61 is positioned normally below the V-shaped block 63 so that as it rises, the inclined surface 61' will force the V-shaped block 63 over the end of the pin 40 (see Fig. 2).

This takes place after the weight has dropped and the drum been partially turned setting the drum vibrating. In Fig. 11, the cam has released the lever 60 allowing the block 61 to drop down and so release the V-shaped block 63 allowing it to be drawn back from the pin by the spring 64 acting on the lever 63' to which the block 63 is secured. The lever 63' is pivoted to a bracket 66 connected with the machine by bar 8. The rotation of the cam now gradually lifts the block 61 forcing inward the block 63 and steadying the pin and the drum. Just before the cam turns to a position to drop the lever 53 and the weight it drops the lever 60 and the block 61. The block 63 is now drawn back out of the way so that the pins can pass by it.

The timing of the parts is so arranged that the order of the several operations will take place as already described, namely, the charge of nuts having been allowed to run into the chute 3, the gate valve 30 is lifted and the entire charge is dumped into the oil when the drum is in its first position as at Fig. 8. After the standard interval has elapsed between motions and while the cam 45 is making one revolution, the weight will be lifted and dropped onto one of the pins and the drum will turn one-third revolution to its second position. During this turning operation, the nuts will be swept out of the oil and tumbled back into it where they will continue to fry. During the next revolution of the cam the weight will be again lifted to the next pin and the drum will be turned to its third position. During this operation, the nuts are swept from the pool by the obstruction 14' and again tumbled back into the oil (see Fig. 10).

The next revolution turns the drum once more as explained, where the nuts will be skimmed out by the apron 17 to position shown in Fig. 6. The next rotation causes the nuts to pass through the trough and discharges as already explained.

It will thus be seen that there is a regular intermittent supply of nuts being fed to the rotating drum and discharged therefrom during three successive revolutions of the cam, the speed of which may be regulated in any suitable manner to govern the output of the machine.

It is evident that my machine may be easily adapted for frying nuts other than peanuts or indeed any small articles which are capable of being handled in small masses.

I claim:—

1. In a machine for frying shelled nuts and the like, the combination of a rotary drum adapted to contain a quantity of frying fat, means for intermittently discharging into said fat a quantity of nuts, means for rotating said drum to lift said nuts out of the fat, a trough on the interior of said drum for collecting said nuts as the drum turns and discharging them from the drum.

2. In a machine for frying shelled nuts and the like, the combination of a rotary drum adapted to contain a quantity of frying fat, means for intermittently discharging into said fat a quantity of nuts, means for rotating said drum to lift said nuts out of the oil and means for discharging the fried nuts from the interior of said drum.

3. In a machine for frying shelled nuts and the like, the combination of a rotary drum adapted to contain a quantity of frying fat, means for intermittently discharging into said fat a quantity of nuts and means for rotating said drum by relatively rapid intermittent movements and relatively long pauses between said movements for cooking said nuts.

4. In a machine for frying shelled nuts and the like, the combination of a rotary drum adapted to contain a quantity of frying fat, means for discharging into said fat a quantity of nuts, means for rotating said drum to lift said nuts out of the fat, an obstruction in said drum over which said nuts tumble back into the oil as they are lifted by the rotation of the drum, and means for discharging said nuts from said drum after they are fried.

5. In a machine for frying shelled nuts and the like, the combination of an imperforate rotary drum adapted to contain a quantity of frying oil, means for discharging into said oil a quantity of nuts, means for rotating said drum, a trough in the interior of said drum having a perforated apron for lifting said nuts out of the fat, said trough being disposed in position to receive said nuts as the drum revolves and to discharge the same from the open side of said drum.

6. A machine for cooking nuts and the like, holding cooking liquid and having, in combination, a container arranged with its bottom below the surface of the liquid; means for feeding nuts to the bottom of a container; said container having means within it for withdrawing the nuts from its bottom and discharging them from the container.

7. In a machine for frying peanuts and the like the combination of a drum having a central opening therein, means for feeding successive batches of uncooked nuts or the like into said drum through said opening, means for retaining a quantity of cooking oil with which said nuts may come in contact as the drum rotates and thereby become subjected to the frying operation, means for reheating the oil to cook the nuts and means for discharging said nuts, when cooked, through said central opening.

8. A machine for cooking nuts and the like holding cooking liquid and comprising, in combination, a movable container arranged to receive a mass of nuts to be cooked in said liquid having a bottom and lateral sides surrounding said mass and adapted during its cycle of movements to withdraw the nuts from the liquid and discharge them from the container, and means for moving said container.

9. A machine for cooking nuts and the like, holding cooking liquid and having, in combination, means for feeding nuts into the liquid; and a container, adapted to receive the nuts thus fed, comprising means within it for agitating the nuts in the liquid and other means within it for withdrawing the nuts from the liquid and discharging them from the container.

10. A machine for cooking nuts and the like, holding cooking liquid and having, in combination, means for feeding nuts into the liquid; a movable container adapted to receive the nuts thus fed and to withdraw them from the liquid and discharge them from the machine; and means for moving said container to effect said withdrawal and discharge.

11. A machine for cooking nuts and the like, holding cooking liquid and having, in combination, means for feeding nuts into the liquid; a movable container adapted to receive the nuts thus fed and to withdraw them from the liquid in position to drain them and subsequently to discharge them from the machine; and means for moving said container to effect said withdrawal and discharge.

12. A machine for cooking nuts and the like, holding cooking liquid and having, in combination, means for feeding nuts into the liquid; and a rotatable container adapted to receive the nuts thus fed, and comprising means rotating with the container, for withdrawing the nuts from the liquid and discharging them from the machine.

13. A machine for cooking nuts or the like holding cooking liquid and comprising, in combination, means for feeding a mass of nuts to be cooked in said liquid; and movable means arranged and organized to receive said mass having a bottom and lateral sides surrounding said mass; said means being adapted to withdraw the nuts from the liquid and discharge them from the said movable means.

ADELARD G. DESCHENES.